(12) United States Patent
Kubo et al.

(10) Patent No.: US 9,627,764 B2
(45) Date of Patent: Apr. 18, 2017

(54) ANTENNA DEVICE AND COMMUNICATION TERMINAL APPARATUS

(71) Applicant: MURATA MANUFACTURING CO., LTD., Kyoto (JP)

(72) Inventors: Hiroyuki Kubo, Kyoto (JP); Kuniaki Yosui, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 393 days.

(21) Appl. No.: 14/065,104

(22) Filed: Oct. 28, 2013

(65) Prior Publication Data

US 2014/0049436 A1 Feb. 20, 2014

Related U.S. Application Data

(63) Continuation of application No. PCT/JP2012/072547, filed on Sep. 5, 2012.

(30) Foreign Application Priority Data

Sep. 9, 2011 (JP) ................. 2011-196970

(51) Int. Cl.
*H01Q 7/08* (2006.01)
*G06K 7/10* (2006.01)
(Continued)

(52) U.S. Cl.
CPC .......... *H01Q 7/08* (2013.01); *G06K 7/10336* (2013.01); *G06K 7/10386* (2013.01);
(Continued)

(58) Field of Classification Search
None
See application file for complete search history.

(56) References Cited

U.S. PATENT DOCUMENTS

2005/0007296 A1* 1/2005 Endo .................. G06K 19/0726
343/895
2005/0040997 A1* 2/2005 Akiho .................. G06K 7/0008
343/866
(Continued)

FOREIGN PATENT DOCUMENTS

CN 1596415 A 3/2005
CN 101931123 A 12/2010
(Continued)

OTHER PUBLICATIONS

International Search Report; PCT/JP2012/072547; Dec. 11, 2012.
(Continued)

*Primary Examiner* — Robert Karacsony
(74) *Attorney, Agent, or Firm* — Studebaker & Brackett PC (57) ABSTRACT

An antenna device includes a first coil wound in one direction and a second coil disposed adjacent to the first coil and wound in a direction opposite to the winding direction of the first coil and having conductor openings at the centers of wound coils, and a magnetic core. The magnetic core is inserted into the conductor opening of the first coil and the conductor opening of the second coil. A portion of a conductor line forming the first coil positioned farther away from the second coil than a portion of the conductor line forming the first coil positioned closer to the second coil, and a portion of a conductor line forming the second coil positioned farther away from the first coil than a portion of the conductor line forming the second coil positioned closer to the first coil, are disposed along the first main surface of the magnetic core.

17 Claims, 6 Drawing Sheets

(51) Int. Cl.
*H01Q 1/22* (2006.01)
*H01Q 1/24* (2006.01)
*H01Q 1/48* (2006.01)
*H01Q 7/06* (2006.01)

(52) U.S. Cl.
CPC ........... *H01Q 1/2225* (2013.01); *H01Q 1/243* (2013.01); *H01Q 1/48* (2013.01); *H01Q 7/06* (2013.01)

(56) References Cited

U.S. PATENT DOCUMENTS

| | | | | |
|---|---|---|---|---|
| 2006/0151619 | A1* | 7/2006 | Ninomiya | G06K 7/0008 235/492 |
| 2010/0156729 | A1* | 6/2010 | Kubo | G06K 7/10316 343/702 |
| 2010/0309081 | A1* | 12/2010 | Kobayashi | G06K 7/10316 343/788 |
| 2010/0321267 | A1* | 12/2010 | Ito | H01Q 7/08 343/788 |

FOREIGN PATENT DOCUMENTS

| | | |
|---|---|---|
| CN | 201868561 U | 6/2011 |
| JP | 2002-325013 A | 11/2002 |
| JP | 2008-028642 A | 2/2008 |
| JP | 2011-004316 A | 1/2011 |
| WO | 2009/078214 A1 | 6/2009 |

OTHER PUBLICATIONS

Written Opinion of the International Searching Authority; PCT/JP2012/072547; Dec. 11, 2012.
The first Office Action issued by the State Intellectual Property Office of People's Republic of China on Aug. 20, 2014, which corresponds to Chinese Patent Application No. 201280020812.1 and is related to U.S. Appl. No. 14/065,104; with English language translation.

* cited by examiner

ANTENNA DEVICE AND COMMUNICATION TERMINAL APPARATUS

CROSS REFERENCE TO RELATED APPLICATIONS

The present application is a continuation of International Application No. PCT/JP2012/072547 filed on Sep. 5, 2012, and claims priority to Japanese Patent Application No. 2011-196970 filed on Sep. 9, 2011, the entire contents of each of these applications being incorporated herein by reference in their entirety.

TECHNICAL FIELD

The technical field relates to an antenna device and a communication terminal apparatus used in an RFID (Radio Frequency Identification) system or an NFC (Near Field Communication) system in which communication is performed with a communication party device via electromagnetic field signals.

BACKGROUND

In an RFID system and an NFC system which are widely used these days, in order to perform communication between a communication terminal apparatus, such as a cellular phone terminal, and a reader/writer or between communication terminal apparatuses, antennas used for performing communication are individually mounted on the apparatuses. Among these antennas, an antenna mounted on a communication terminal apparatus is disclosed in Japanese Unexamined Patent Application Publication No. 2002-325013 (Patent Document 1).

Figure 7:
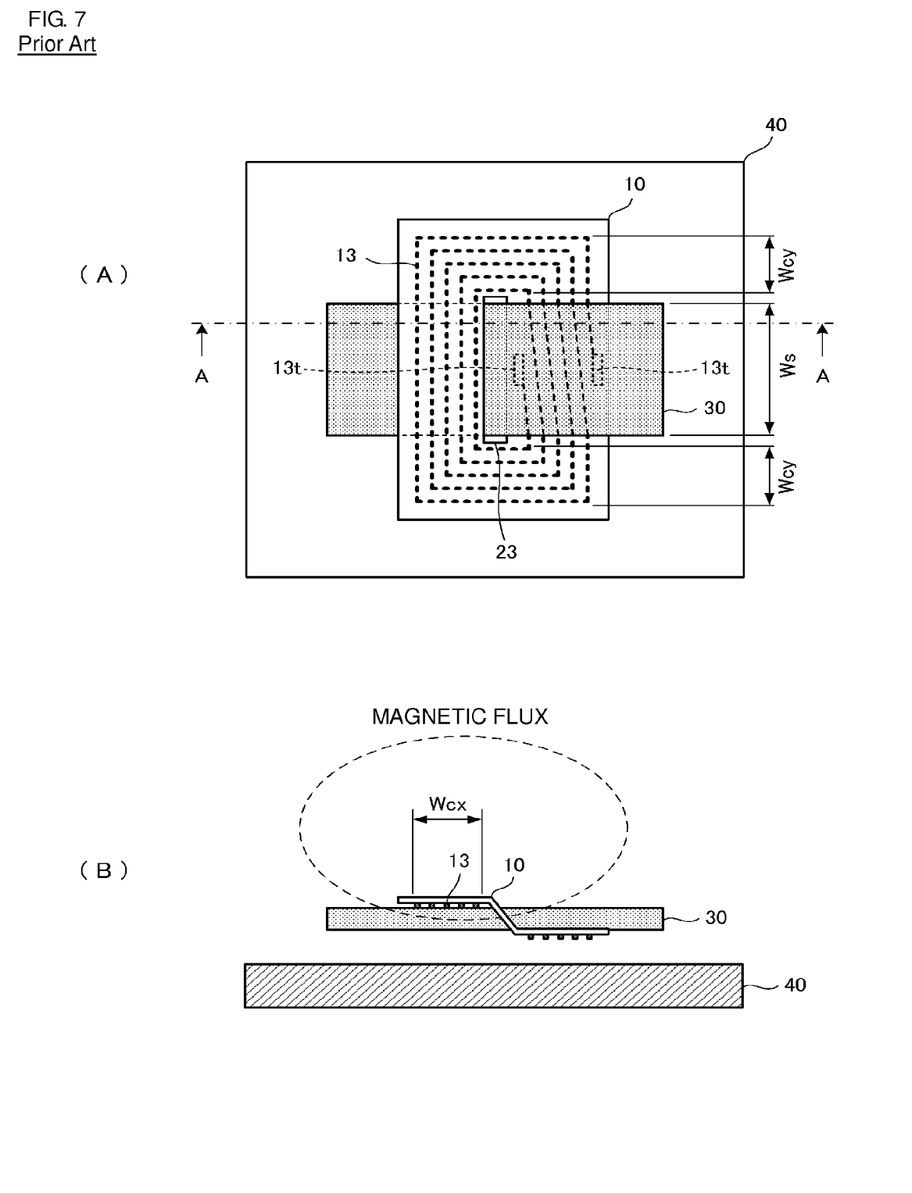
FIG. 7 shows views of the configuration of an antenna device disclosed in Patent Document 1, which are represented for easy comparison with embodiments of the present disclosure.

FIG. 7 shows views of the configuration of an antenna device disclosed in Patent Document 1, which are represented for easy comparison with the embodiments according to present disclosure. FIG. 7(A) is a plan view of the antenna device, and FIG. 7(B) is a sectional view taken along line A-A of FIG. 7(A).

The antenna device shown in FIGS. 7(A) and 7(B) includes a flexible substrate 10, a coil 13 formed on the flexible substrate 10 and constituted by spiral conductor lines having a conductor opening at the center of the wound coil, and a magnetic core 30. A slit 23 is formed in the conductor opening of the flexible substrate 10, and the magnetic core 30 is inserted into the slit 23. A connecting portion 13t is formed at each of an inner peripheral end and an outer peripheral end. This antenna device is arranged above a metallic body 40.

SUMMARY

The present disclosure provides an antenna device and a communication terminal apparatus in which a required communication range can be secured without increasing the size of the antenna device or the communication terminal apparatus.

An antenna device according to an embodiment of the present disclosure includes a first coil which is wound in one direction, a second coil which is wound in a direction opposite to the winding direction of the first coil and which is disposed adjacent to the first coil, and a magnetic core having a first main surface and a second main surface. The first coil and the second coil are disposed such that a conductor opening of the first coil and a conductor opening of the second coil are adjacent to each other, as viewed from above. The magnetic core is inserted into the conductor opening of the first coil and the conductor opening of the second coil such that a portion of a conductor line forming the first coil positioned farther away from the second coil than a portion of the conductor line forming the first coil and positioned closer to the second coil, and a portion of a conductor line forming the second coil positioned farther away from the first coil than a portion of the conductor line forming the second coil and positioned closer to the first coil, are disposed along the first main surface of the magnetic core.

The state in which "a conductor opening of the first coil and a conductor opening of the second coil are adjacent to each other, as viewed from above" is not a state in which the first coil and the second coil are disposed such that the opening of the first coil and the opening of the second coil oppose (face) each other, but a state in which the first coil and the second coil are disposed such that both of the conductor opening of the first coil and the conductor opening of the second coil can be seen, as viewed from above.

In a more specific embodiment, the magnetic core inserted into the conductor opening of the first coil and the magnetic core inserted into the conductor opening of the second coil may be an integrally formed magnetic core.

In another more specific embodiment, the antenna device may further include a metallic body disposed on the side of the second main surface of the magnetic core. That is, the antenna device may be formed together with a metallic body adjacent to the antenna device.

In another more specific embodiment, the width of the portion of the conductor line forming the first coil positioned farther away from the second coil may be thicker than the width of the portion of the conductor line forming the first coil positioned closer to the second coil, or the width of the portion of the conductor line forming the second coil positioned farther away from the first coil may be thicker than the width of the portion of the conductor line forming the second coil positioned closer to the first coil.

In yet another more specific embodiment, the first coil and the second coil may be formed on a substrate. A slit may be formed in the substrate at positions corresponding to positions of the conductor opening of the first coil and the conductor opening of the second coil, and the magnetic core may preferably be inserted into the slits.

In still another more specific embodiment, the above substrate may be a flexible substrate.

A communication terminal apparatus according to an embodiment of the present disclosure includes a casing and an antenna device formed within the casing. The antenna device includes a first coil which is wound in one direction, a second coil which is wound in a direction opposite to the winding direction of the first coil and which is disposed adjacent to the first coil, and a magnetic core having a first main surface and a second main surface. The first coil and the second coil are disposed such that a conductor opening of the first coil and a conductor opening of the second coil are adjacent to each other, as viewed from above. The magnetic core is inserted into the conductor opening of the first coil and the conductor opening of the second coil such that a portion of a conductor line forming the first coil positioned farther away from the second coil than a portion of the conductor line forming the first coil and positioned closer to the second coil, and a portion of a conductor line forming the second coil positioned farther away from the first coil than a portion of the conductor line forming the second coil and positioned closer to the first coil, are disposed along the first main surface of the magnetic core.

In other more specific embodiments of the above antenna device and communication terminal apparatus, the portion of the conductor line forming the first coil and positioned closer to the second coil and the portion of the conductor line forming the second coil and positioned closer to the first coil may be disposed along the second main surface of the magnetic core.

BRIEF DESCRIPTION OF DRAWINGS

FIG. 7(A) is a plan view of the antenna device; and FIG. 7(B) is a sectional view taken along line A-A of FIG. 7(A).

DETAILED DESCRIPTION

The inventors recognized the following with respect to the antenna device described in Patent Document 1. The antenna device shown in FIG. 7 has a structure in which the thin magnetic core 30 is inserted into the slit 23 formed in the conductor opening of the planar coil 13 which is formed on the flexible substrate 10. Accordingly, as the number of turns of the coil 13 is increased, the width Wcy of an outer portion of the wound coil 13 positioned outside of the slit 23 which constitutes an area in which the conductor lines of the coil are formed is increased. Thus, as the number of turns of a coil is increased, a coil forming area (the area or the volume taken up by the coil) is increased. If the number of turns of the coil is increased without having to increase the coil forming area (the area taken up by the coil), it is necessary to reduce the width Ws of a magnetic core. In this case, the degree of coupling with an antenna of a communication party (for example, an antenna of a reader/writer) is decreased. That is, the width of a magnetic core is a substantial factor which determines the performance of an antenna. A smaller width of a magnetic core causes deterioration in antenna characteristics.

Additionally, in order to increase the maximum range by which communication can be performed with an antenna of a communication party (maximum communication range), it is important to increase a loop of magnetic flux which passes through a magnetic core and interlinks with a coil of an antenna device. In order to implement this, in the antenna device having a structure shown in FIG. 7, the width Wcx of the coil forming area in the axial direction of the magnetic core 30 can be effectively increased. This, however, also increases the width of the coil forming area disposed under the magnetic core 30. As a result, the entire coil forming area is increased.

Exemplary embodiments of an antenna device that can address the above shortcomings will now be described with reference to the drawings.

FIG. 1(A) is a plan view of an antenna device 101 according to a first exemplary embodiment, and FIG. 1(B) is a sectional view taken along line A-A of FIG. 1(A).

The antenna device shown in FIGS. 1(A) and 1(B) includes a flexible substrate 10, a first coil 11 and a second coil 12 formed on the flexible substrate 10 and constituted by spiral conductor lines having conductor openings at the centers of the wound coils, and a magnetic core 30. Slits 21 and 22 are formed in the conductor openings of the flexible substrate 10, and the magnetic core 30 is inserted into the slits 21 and 22. A connecting portion 1it is formed at an end portion of the first coil 11, and a connecting portion 12t is formed at an end portion of the second coil 12. This antenna device is arranged above a metallic body 40.

Figure 1:
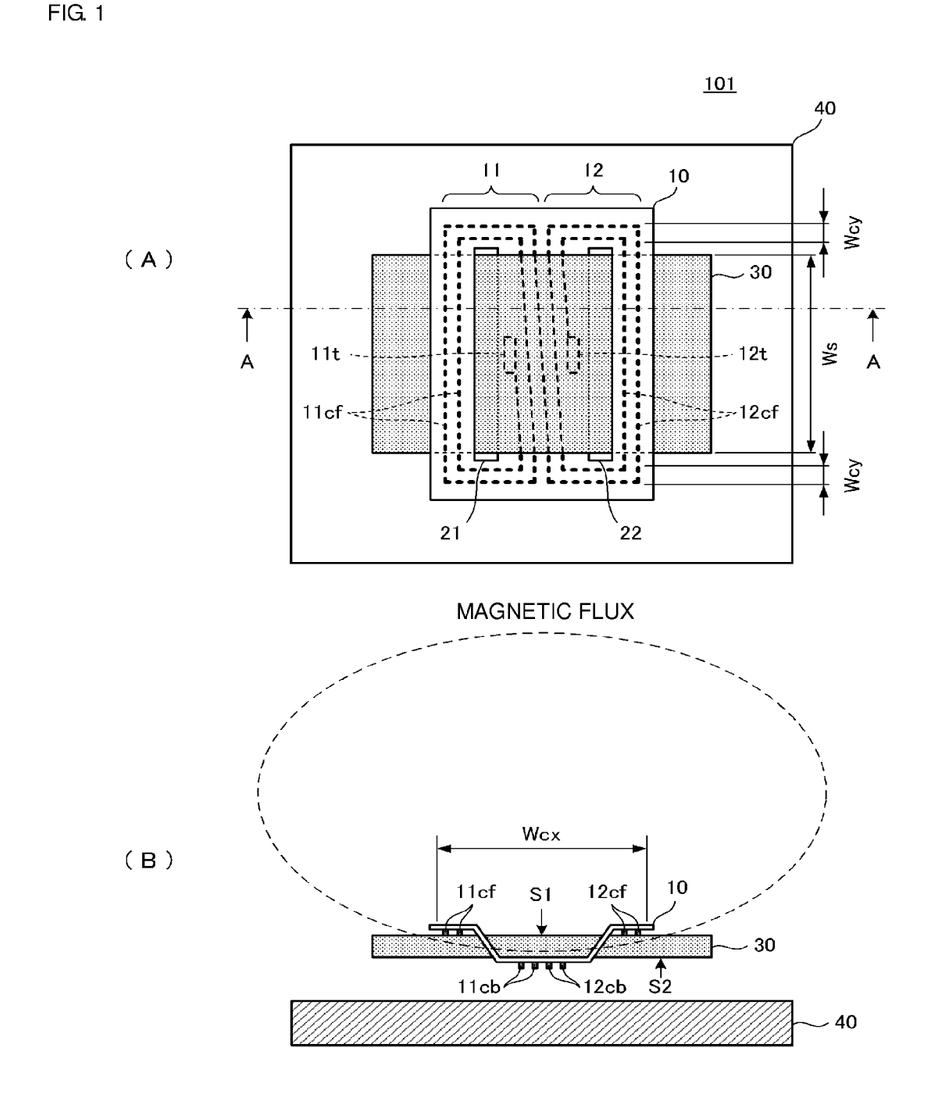
FIG. 1(A) is a plan view of an antenna device 101 according to a first exemplary embodiment.
FIG. 1(B) is a sectional view taken along line A-A of FIG. 1(A).

The first coil 11 is wound in one direction (e.g., clockwise from the inner periphery to the outer periphery in the example shown in FIG. 1). The second coil 12 is wound in a direction opposite to the winding direction of the first coil 11 (e.g., counterclockwise from the outer periphery to the inner periphery in the example shown in FIG. 1). The outer periphery of the first coil 11 and the outer periphery of the second coil 12 are connected to each other (i.e., continuously connected). The first coil 11 and the second coil 12 are disposed adjacent to each other, as viewed from above, or in plan view.

The first slit 21 is formed in the conductor opening of the first coil 11, and the second slit 22 is formed in the conductor opening of the second coil 12.

The magnetic core 30 is inserted into the first slit 21 and the second slit 22 such that a conductor line 11cf of the first coil 11 positioned farther away from the second coil 12 and a conductor line 12cf of the second coil 12 positioned farther away from the first coil 11 are disposed on a first main, or major surface S1 of the magnetic core 30.

That is, considering that the magnetic core 30 is inserted from the first slit 21 to the second slit 22 of the flexible substrate 10 (from the left side to the right side of FIG. 1(A)), the magnetic core 30 is inserted into the first slit 21 in a direction from the bottom surface to the top surface of the flexible substrate 10, and is inserted into the second slit 22 in a direction from the top surface to the bottom surface of the flexible substrate 10.

As shown in FIG. 1(B), because of the conductor lines 11cf and 12cf of the first coil 11c and the second coil 12, respectively, disposed on the top surface of the magnetic core 30, a large width of a coil forming area (i.e., the width in the axial direction of the magnetic core 30) Wcx can be secured. In comparison of FIG. 1(B) with FIG. 7(B) showing the structure of an antenna of the related art, it is clearly seen that the width Wcx of the coil-conductor forming area on the first main surface S1 of the magnetic core 30 is about twice as large as the width of the antenna having a structure of the related art. Accordingly, the loop of magnetic flux which passes through the conductor openings of the first coil 11 and the second coil 12 is increased, thereby increasing the maximum communication range.

When integrating the antenna device 101 into, for example, a mobile terminal apparatus, the antenna device 101 may be disposed in proximity with a metallic body, such as a battery pack within a casing or a metallic casing. In this case, since magnetic flux concentrates on a surface away from the metallic body, it is important that the metallic body is disposed on the side of a second main, or major surface S2 of the magnetic core 30. With this configuration, the advantage that the loop of magnetic flux is increased due to a large width Wcx of the coil forming area in the axial direction of the magnetic core 30 is not impaired.

As shown in FIG. 1(A), the width Wcy of outer portions of the first and second coils 11 and 12 wound around the slits 21 and 22, respectively, which constitutes an area in which the conductor lines of the coils are formed, is small. That is, since the number of turns of each of the first and second coils is only half the number of the antenna having the structure of the related art shown in FIG. 7(A), the above-described width Wcy is also reduced by half the width of the antenna having the structure of the related art shown in FIG. 7(A). Thus, a comparatively large width Ws of the magnetic core 30 relative to the size of the entire antenna device can be obtained, which makes it possible to increase the antenna performance without changing the outer dimensions of the coils. For example, the degree of coupling with an antenna of a communication party (for example, an antenna of a reader/writer) is increased, thereby further increasing the maximum communication range.

Figure 2:
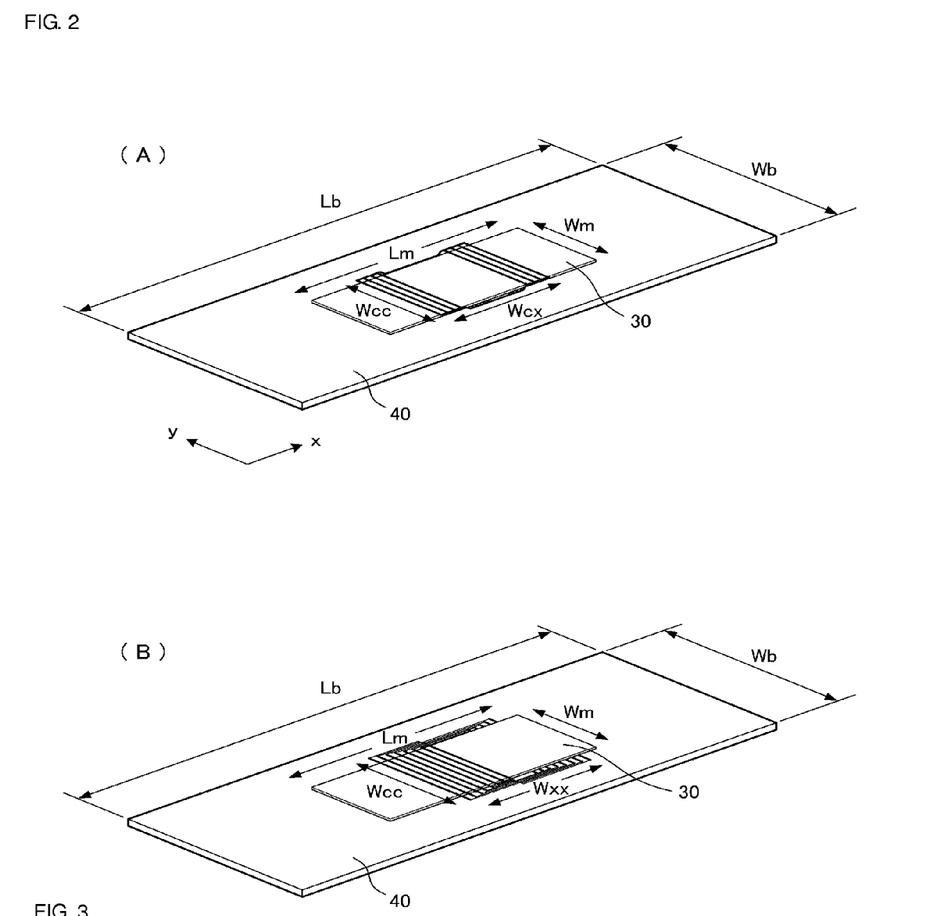
FIG. 2(A) is a perspective view illustrating the dimensions of individual components of an antenna device used for characteristics measurements.
FIG. 2(B) is a perspective view illustrating the dimensions of individual components of an antenna device having a structure of the related art for comparison with the antenna device shown in FIG. 2(A).

The characteristics of the antenna device of the first embodiment will be discussed below. FIG. 2(A) is a perspective view illustrating the dimensions of individual components of an antenna device used for characteristics measurements. FIG. 2(B) is a perspective view illustrating the dimensions of individual components of an antenna device having a structure of the related art for comparison with the antenna device shown in FIG. 2(A). In FIGS. 2(A) and 2(B), a flexible substrate is not shown. The dimensions of the individual components are as follows.

Wcx: 16 mm
Wxx: 16 mm
Wcc: 20 mm
Lm: 40 mm
Wm: 16 mm
Lb: 90 mm
Wb: 40 mm
the number of turns of a coil: 8

Figure 3:
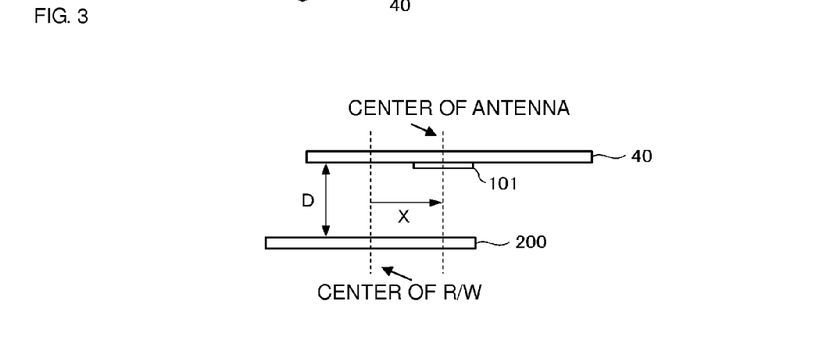
FIG. 3 illustrates a positional relationship between an antenna device and an antenna of a reader/writer.

FIG. 3 illustrates a positional relationship between the antenna device and an antenna of a reader/writer. In this example, a displacement X of the center of the antenna device in the x-axis direction with respect to the center of the antenna 200 of the reader/writer is changed while the spacing D between the antenna 200 of the reader/writer and the antenna device is fixed to 40 mm. The antenna 200 of the reader/writer is a circular coil antenna having a diameter of 100 mm and having three turns of windings.

Figure 4:
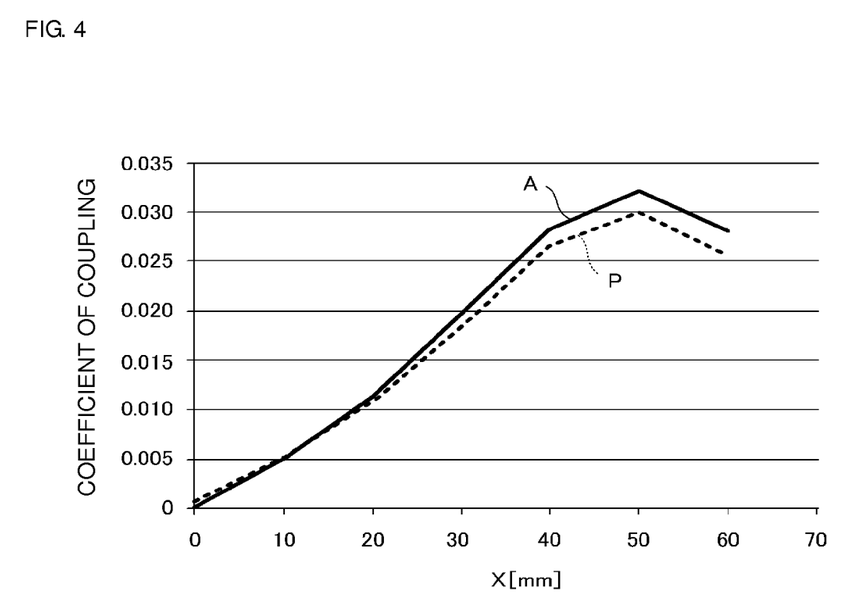
FIG. 4 is a diagram showing a change in the coefficient of coupling between an antenna 200 of a reader/writer and the antenna device with respect to a change in a displacement X in the x-axis direction.

FIG. 4 is a diagram showing a change in the coefficient of coupling between the antenna 200 of the reader/writer and the antenna device with respect to a change in the above-described displacement X. A curve A indicates characteristics of the antenna device of the first embodiment, while a curve B indicates characteristics of the antenna device having the structure of the related art.

When the displacement X of the center of the antenna device in the x-axis direction with respect to the center of the antenna 200 of the reader/writer is 0, the magnetic flux of the antenna 200 of the reader/writer is split from the center of the magnetic core to both end portions of the magnetic core by substantially the same amount and then passes through the magnetic core of the antenna device. Accordingly, the coefficient of coupling is 0 (gain is 0). As the displacement X increases, the coefficient of coupling increases, and in this example, when the displacement X reaches 50 mm, the coefficient of coupling is maximized, and as the displacement X further increases, the coefficient of coupling decreases since the inter-antenna distance increases. Concerning both of the antenna device of the first embodiment and the antenna device having the structure of the related art, a bell-shaped curve having a similar tendency is obtained. However, the coefficient of coupling of the antenna device of the first embodiment is increased by about 7% over the antenna device having the structure of the related art.

Thus, it has been proved that the maximum communication range can be increased in accordance with this amount of increase in the coefficient of coupling.

FIG. 5(A) is a plan view of an antenna device 102 according to a second exemplary embodiment, and FIG. 5(B) is a sectional view taken along line A-A of FIG. 5(A).

The antenna device shown in FIGS. 5(A) and 5(B) includes a flexible substrate 10, a first coil 11 and a second coil 12 formed on the flexible substrate 10 and constituted by spiral conductor lines having conductor openings at the centers of the wound coils, and a magnetic core 30. Slits 21 and 22 are formed in the conductor openings of the flexible substrate 10, and the magnetic core 30 is inserted into the slits 21 and 22. A connecting portion 1it is formed at an end portion of the first coil 11, and a connecting portion 12t is formed at an end portion of the second coil 12. This antenna device is arranged above a metallic body 40.

Figure 5:
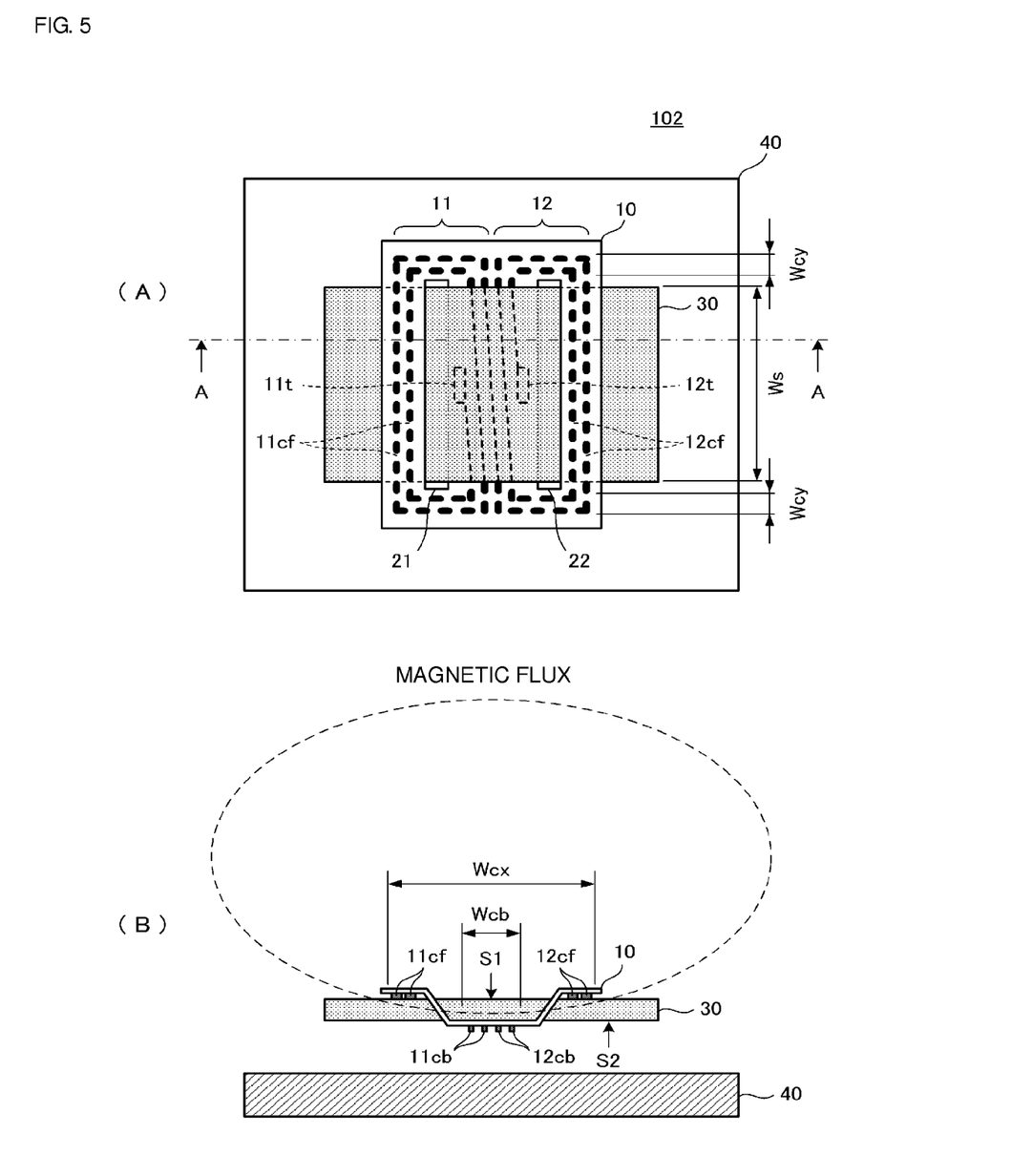
FIG. 5(A) is a plan view of an antenna device 102 according to a second exemplary embodiment.
FIG. 5(B) is a sectional view taken along line A-A of FIG. 5(A).

The antenna device 102 is different from the antenna device 101 of the first embodiment shown in FIG. 1 in the width of the conductor lines of the coils 11 and 12. In the antenna device 102 of the second embodiment, the width of a conductor line 11cf of the first coil 11 positioned farther away from the second coil 12 is thicker, or greater than the width of a conductor line 11cb of the first coil 11 positioned closer to the second coil 12. Similarly, the width of a conductor line 12cf of the second coil 12 positioned farther away from the first coil 11 is thicker, or greater than the width of a conductor line 12cb of the second coil 12 positioned closer to the first coil 11.

The conductor lines 11cf and 12cf are lines which interlink with magnetic flux and which generate an electromotive force while the antenna device 102 is magnetically coupling with an antenna of a reader/writer. Accordingly, since these conductor lines have a thick width, the coefficient of coupling is improved. In contrast, the conductor lines 11cb and the 12cb positioned opposite the conductor lines 11cf and 12cf with the magnetic core 30 therebetween are not conductor lines which interlink with the magnetic flux and merely allow a current to pass therethrough. Accordingly, even if these conductor lines have a relatively thin width, they do not influence the coefficient of coupling.

Additionally, as the widths of the conductor lines 11cf and 12cf increase, the interval between conductor lines 11cf and the interval between conductor lines 12cf decrease. Accordingly, a leakage of magnetic flux in an area in which a plurality of conductor lines 11cf are formed becomes smaller. Similarly, a leakage of magnetic flux in an area in which a plurality of conductor lines 12cf are formed also becomes smaller. Thus, the phenomenon in which magnetic flux which is passing through the magnetic core 30 leaks from the interval (gap) between the conductor lines 11cf or between the conductor lines 12cf so as to decrease a loop of the magnetic flux can be suppressed. That is, a loop of magnetic flux which passes through the magnetic core 30 is increased, thereby increasing the maximum communication range.

Figure 6:
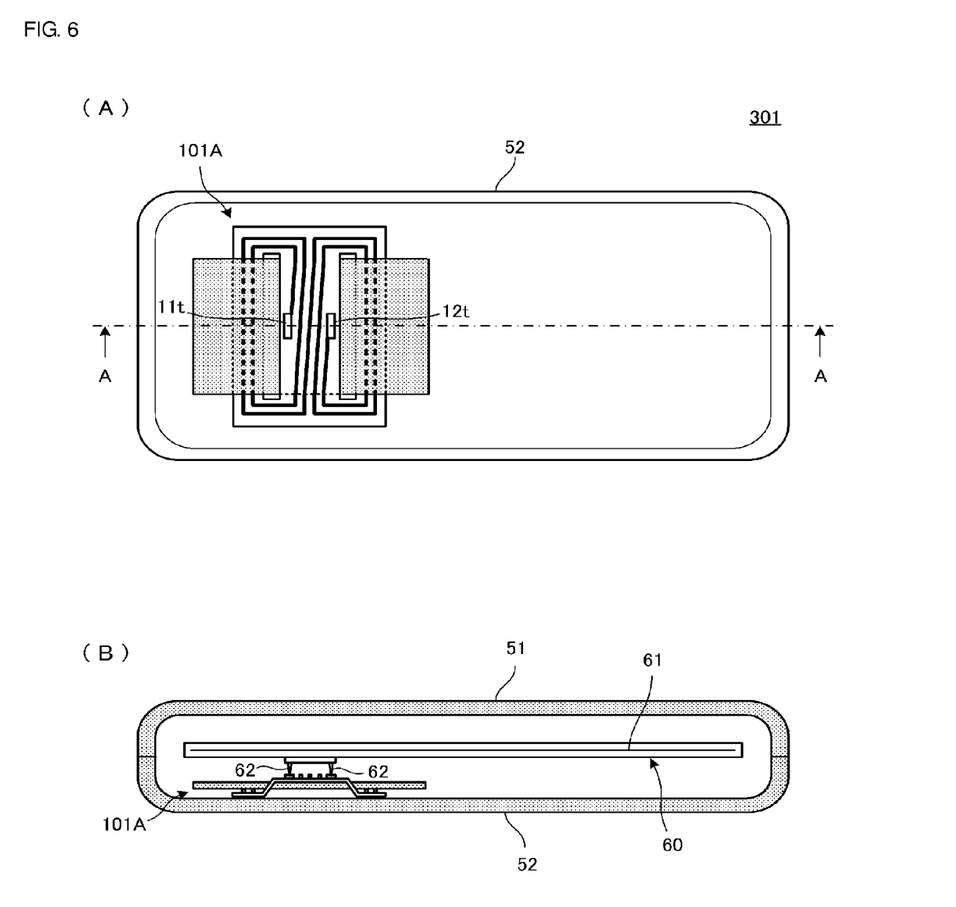
FIG. 6(A) is a schematic plan view of a communication terminal apparatus according to a third exemplary embodiment.
FIG. 6(B) is a sectional view taken along line A-A of FIG. 6(A).

FIG. 6(A) is a schematic plan view of a communication terminal apparatus 301 according to a third exemplary embodiment, and FIG. 6(B) is a sectional view taken along line A-A of FIG. 6(A). In FIG. 6(A), only a lower casing 52 and an antenna device 101A are shown.

As shown in FIG. 6(B), the communication terminal apparatus 301 includes an upper casing 51, the lower casing 52, a printed wiring board 60, and the antenna device 101A. The antenna device 101A is the antenna device 101 discussed in the first exemplary embodiment from which the metallic body 40 is removed. The antenna device 101A is attached to the inner surface of the lower casing 52. The printed wiring board 60 includes a two-dimensionally extending ground conductor 61 and pin terminals 62. In the state in which the printed wiring board 60 is integrated within the casings 51 and 52, the pin terminals 62 are electrically connected to the connecting portions 1it and 12t of the antenna device 101A while being abutting against the connecting portions 1it and 12t.

In this manner, a communication terminal apparatus in which an antenna device is housed within a casing can be configured.

In the above-described exemplary embodiments, the coils are constituted by spiral conductor lines. However, these coils are not restricted to a spiral shape, but may be a loop shape.

In the above-described embodiments, the major components of a coil pattern are formed on one surface of the flexible substrate 10. However, coils may be provided by forming spiral conductor patterns on both surfaces of a flexible substrate.

As the substrate, a flexible substrate having flexibility is preferably used for facilitating the insertion of a magnetic core. However, the type of substrate is not particularly restricted to a flexible substrate. For example, a substrate made of a rigid material may be bent and used.

The provision of a substrate is not even essential. Metallic wire which forms conductor lines may be directly wound around a magnetic core.

In the above-described embodiments, conductor lines forming the first coil and the second coil are provided such that they do not overlap each other as viewed from above. However, the present disclosure is not restricted to this configuration. That is, the first coil and the second coil may be formed such that conductor lines partially overlap each other as viewed from above, or in plan view.

The metallic body discussed in the above-described embodiments may be other than a battery pack, a metallic casing, a printed wiring board, for example, it may be an LCD panel having a shield sheet.

In the above-described embodiments, an example in which the first coil and the second coil are connected in series with each other has been discussed. However, the first coil and the second coil may be connected in parallel with each other. In this case, the first coil and the second coil are connected in parallel with each other in polarities such that a current and a voltage induced in the first coil are in phase with a current and a voltage induced in the second coil when magnetic flux passes through the magnetic core 30 in one direction.

In the above-described embodiments, a single magnetic core is used. However, a magnetic core inserted into the first slit 21 and a magnetic core inserted into the second slit 22 may be formed as different magnetic cores.

Embodiments according to the present disclosure make it possible to form an antenna device which has a small size and yet secures a required communication range.

That which is claimed is:

1. An antenna device comprising:
a first coil which is wound in one direction;
a second coil which is wound in a direction opposite to the winding direction of the first coil and which is disposed adjacent to the first coil; and
a magnetic core having a first main surface and a second main surface, wherein
the first coil and the second coil are disposed such that a conductor opening of the first coil and a conductor opening of the second coil are adjacent to each other, as viewed from above,
the magnetic core is inserted into the conductor opening of the first coil and the conductor opening of the second coil such that a portion of a conductor line forming the first coil positioned farther away from the second coil than a portion of the conductor line forming the first coil and positioned closer to the second coil, and a portion of a conductor line forming the second coil positioned farther away from the first coil than a portion of the conductor line forming the second coil and positioned closer to the first coil, are disposed along the first main surface of the magnetic core,
the windings of the first coil and the windings of the second coil are each configured such that an innermost winding portion of each of the first and second coils on the second main surface are closer to each other as compared to respective innermost winding portions of the first and second coils on the first main surface, and
the first coil and the second coil are connected with each other in polarities such that a current and a voltage induced in the first coil are in phase with a current and a voltage induced in the second coil when magnetic flux passes through the magnetic core in one direction.

2. The antenna device according to claim 1, wherein the magnetic core inserted into the conductor opening of the first coil and the magnetic core inserted into the conductor opening of the second coil are an integrally formed magnetic core.

3. The antenna device according to claim 1, further comprising a metallic body disposed on the side of the second main surface of the magnetic core.

4. The antenna device according to claim 2, further comprising a metallic body disposed on the side of the second main surface of the magnetic core.

5. The antenna device according to claim 1, wherein the width of the portion of the conductor line forming the first coil positioned farther away from the second coil is thicker than the width of the portion of the conductor line forming the first coil positioned closer to the second coil or the width of the portion of the conductor line forming the second coil positioned farther away from the first coil is thicker than the width of the portion of the conductor line forming the second coil positioned closer to the first coil.

6. The antenna device according to claim 2, wherein the width of the portion of the conductor line forming the first coil positioned farther away from the second coil is thicker than the width of the portion of the conductor line forming the first coil positioned closer to the second coil or the width of the portion of the conductor line forming the second coil positioned farther away from the first coil is thicker than the width of the portion of the conductor line forming the second coil positioned closer to the first coil.

7. The antenna device according to claim 3, wherein the width of the portion of the conductor line forming the first coil positioned farther away from the second coil is thicker than the width of the portion of the conductor line forming the first coil positioned closer to the second coil or the width of the portion of the conductor line forming the second coil positioned farther away from the first coil is thicker than the width of the portion of the conductor line forming the second coil positioned closer to the first coil.

8. The antenna device according to claim 4, wherein the width of the portion of the conductor line forming the first coil positioned farther away from the second coil is thicker than the width of the portion of the conductor line forming the first coil positioned closer to the second coil or the width of the portion of the conductor line forming the second coil positioned farther away from the first coil is thicker than the width of the portion of the conductor line forming the second coil positioned closer to the first coil.

9. The antenna device according to claim 1, wherein:
the first coil and the second coil are formed on a substrate; and
a slit is formed in the substrate at positions corresponding to positions of the conductor opening of the first coil and the conductor opening of the second coil, and the magnetic core is inserted into the slits.

10. The antenna device according to claim 9, wherein the substrate is a flexible substrate.

11. The antenna device according to claim 1, wherein the portion of the conductor line forming the first coil and positioned closer to the second coil and the portion of the conductor line forming the second coil and positioned closer to the first coil are disposed along the second main surface of the magnetic core.

12. A communication terminal apparatus comprising:
a casing; and
an antenna device formed within the casing, wherein
the antenna device includes a first coil which is wound in one direction, a second coil which is wound in a direction opposite to the winding direction of the first coil and which is disposed adjacent to the first coil, and a magnetic core having a first main surface and a second main surface,
the first coil and the second coil are disposed such that a conductor opening of the first coil and a conductor opening of the second coil are adjacent to each other, as viewed from above,
the magnetic core is inserted into the conductor opening of the first coil and the conductor opening of the second coil such that a portion of a conductor line forming the first coil positioned farther away from the second coil than a portion of the conductor line forming the first coil and positioned closer to the second coil, and a portion of a conductor line forming the second coil positioned farther away from the first coil than a portion of the conductor line forming the second coil and positioned closer to the first coil, are disposed along the first main surface of the magnetic core,
the windings of the first coil and the windings of the second coil are each configured such that an innermost winding portion of each of the first and second coils on the second main surface are closer to each other as compared to respective innermost winding portions of the first and second coils on the first main surface, and
the first coil and the second coil are connected with each other in polarities such that a current and a voltage induced in the first coil are in phase with a current and a voltage induced in the second coil when magnetic flux passes through the magnetic core in one direction.

13. The antenna device according to claim 12, wherein the portion of the conductor line forming the first coil and positioned closer to the second coil and the portion of the conductor line forming the second coil and positioned closer to the first coil are disposed along the second main surface of the magnetic core.

14. The antenna device according to claim 1, wherein the magnetic core inserted into the conductor opening of the first coil and the magnetic core inserted into the conductor opening of the second coil are formed as different magnetic cores.

15. The antenna device according to claim 14, further comprising a metallic body disposed on the side of the second main surface of the magnetic core.

16. The antenna device according to claim 14, wherein the width of the portion of the conductor line forming the first coil positioned farther away from the second coil is thicker than the width of the portion of the conductor line forming the first coil positioned closer to the second coil or the width of the portion of the conductor line forming the second coil positioned farther away from the first coil is thicker than the width of the portion of the conductor line forming the second coil positioned closer to the first coil.

17. The antenna device according to claim 15, wherein the width of the portion of the conductor line forming the first coil positioned farther away from the second coil is thicker than the width of the portion of the conductor line forming the first coil positioned closer to the second coil or the width of the portion of the conductor line forming the second coil positioned farther away from the first coil is thicker than the width of the portion of the conductor line forming the second coil positioned closer to the first coil.

\* \* \* \* \*